(12) United States Patent
Cortes et al.

(10) Patent No.: US 7,660,321 B2
(45) Date of Patent: Feb. 9, 2010

(54) SYSTEM AND METHOD FOR PRIORITIZING SESSION INITIATION PROTOCOL MESSAGES

(75) Inventors: Mauricio Cortes, Scotch Plains, NJ (US); Nachi K. Nithi, Wayne, NJ (US); Anwar I. Walid, Watchung, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 490 days.

(21) Appl. No.: 11/365,240

(22) Filed: Mar. 1, 2006

(65) Prior Publication Data
US 2007/0206620 A1    Sep. 6, 2007

(51) Int. Cl.
*H04L 12/56* (2006.01)
*H04J 1/16* (2006.01)

(52) U.S. Cl. .................. 370/412; 370/352; 370/355; 370/356; 370/401

(58) Field of Classification Search ............ 370/412, 370/352, 355, 356, 401
See application file for complete search history.

(56) References Cited

U.S. PATENT DOCUMENTS 6,760,309 B1 *  7/2004  Rochberger et al. ......... 370/235
7,457,283 B2 * 11/2008  Dalton et al. ............... 370/352
2004/0095906 A1 *  5/2004  Rajkotia .................... 370/332
2005/0105464 A1    5/2005  Acharya et al.

FOREIGN PATENT DOCUMENTS

| EP | 1199851 A1 | 4/2002 |
| WO | WO 00/56024 A | 9/2000 |
| WO | WO 2005/057872 A | 6/2005 |

OTHER PUBLICATIONS

European Patent Office; International Preliminary Examining Authority; Notification of Transmittal of the International Preliminary Report on Patentability; Apr. 21, 2008.
International Search Report dated Sep. 21, 2007.
Rosenberg, J. etal. "SIP: Session Initiation Protocol," OETF Standard, Internet Engineering Task Force, IETF, CH, pp. 1-269; Jun. 2002.

* cited by examiner

Primary Examiner—John Pezzlo
(74) Attorney, Agent, or Firm—Fletcher Yoder

(57) ABSTRACT

There is provided a system and method for prioritizing session initiation protocol ("SIP") messages. More specifically, in one embodiment, there is provided a method of prioritizing SIP messages in a network, the method comprising receiving SIP messages in a first order from one or more other servers of the network, wherein each of the received SIP messages comprises one or more priority indicators, scheduling the received SIP messages into a second order based on one or more of the priority indicators, and processing the scheduled SIP messages in the second order.

20 Claims, 5 Drawing Sheets though such a development effort might be complex and time consuming, it would nevertheless be a routine undertaking of design, fabrication, and manufacture for those of ordinary skill having the benefit of this disclosure.

SYSTEM AND METHOD FOR PRIORITIZING SESSION INITIATION PROTOCOL MESSAGES

BACKGROUND OF THE INVENTION

1. Field of the Invention

This invention relates generally to computer networks, and, more specifically, to Internet Protocol ("IP") based computer networks.

2. Discussion of the Related Art

This section is intended to introduce the reader to various aspects of art that may be related to various aspects of the present invention, which are described and claimed below. This discussion is believed to be helpful in providing the reader with background information to facilitate a better understanding of the various aspects of the present invention. Accordingly, it should be understood that these statements are to be read in this light, and not as admissions of prior art.

The IP multimedia subsystem ("IMS") is a standardized architecture for providing a variety of multimedia services, such as video, audio, instant messaging, online games, and/or telephone calls over IP networks, such as the Internet. The IMS standard employs a variety of different communication protocols to establish and manage these multimedia services. One of these standards, known as session initiation protocol ("SIP"), provides a standard for creating, managing, and terminating communication sessions between users (referred to as "user agents,") within the IMS network. User agents in the IMS network may include wireless telephones, voice over IP telephones, computers, personal digital assistants ("PDAs"), or a variety of other suitable communication devices. One example of a SIP standard is the 3GPP SIP standard propagated by the 3rd Generation Partnership Project ("3GPP").

The SIP standard employs a variety of transmissions, known as SIP messages that are passed between two user agents via one or more SIP servers, such as SIP proxy servers and SIP back to back user agents ("B2BUA"). SIP messages typically include information related to the establishment and teardown of a particular communication session. For example, a SIP message may describe which user agent is initiating the communication, what IP port to use for the communication, what decoding scheme to follow, and so forth. When one user agent wishes to communicate with another user agent, the initiating user agent transmits the SIP message to a proxy server within the IMS network. This proxy server will then transmit the SIP message through one or more other proxy servers in route to the destination user agent. The proxy servers are typically employed because the initiating user agent typically does not know the exact address of the receiving user agent and/or application servers that may provide connection or support for the communication session. As such, SIP messages are transmitted to proxy servers that forward the request to the proper place. After a predetermined number of SIP messages are exchanged (12, for example) a communication session between the two user agents may be established.

In a large IMS network with millions of potential user agents and proxy servers, several thousand or more SIP messages may be processed by individual proxy servers at any given time. Conventional IMS networks are configured to process these requests in a first in-first out ("FIFO") methodology. In other words, the proxy servers are configured to process SIP messages in the order in which they are received. For example, when a proxy server receives its first SIP message, it begins to process that message. If another SIP message is received while the proxy server is processing the first message, it is placed in a SIP message queue behind the first message. If yet another SIP message is received while the proxy server is processing the first message, this third message is placed in the queue behind the second message and so forth. When the proxy server finishes processing the first message, it will start processing the second message regardless of how many messages are in the queue and regardless of the attributes of the messages in the queue.

One or more of the embodiments described herein may be directed towards one or more of the aspects described above.

BRIEF SUMMARY OF THE INVENTION

Certain aspects commensurate in scope with the disclosed embodiments are set forth below. It should be understood that these aspects are presented merely to provide the reader with a brief summary of certain aspects the invention might take and that these aspects are not intended to limit the scope of the invention. Indeed, the invention may encompass a variety of aspects that may not be set forth below.

There is provided a system and method for prioritizing session initiation protocol ("SIP") messages. More specifically, in one embodiment, there is provided a method of prioritizing SIP messages in a network, the method comprising receiving SIP messages in a first order from one or more other servers of the network, wherein each of the received SIP messages comprises one or more priority indicators, scheduling the received SIP messages into a second order based on one or more of the priority indicators, and processing the scheduled SIP messages in the second order.

BRIEF DESCRIPTION OF THE SEVERAL VIEWS OF THE DRAWINGS

Advantages of the invention may become apparent upon reading the following detailed description and upon reference to the drawings in which.

DETAILED DESCRIPTION OF THE INVENTION

Figure 1:
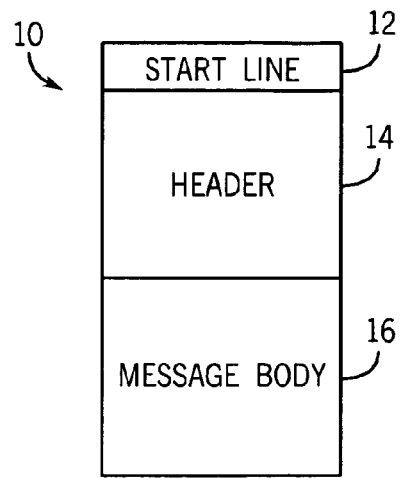
FIG. 1 is a block diagram of an exemplary SIP message in accordance with one embodiment.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions should be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, session initiation protocol ("SIP") messages in a conventional SIP system are scheduled in a first in-first out ("FIFO") methodology. This FIFO scheduling, however, may have several disadvantages. First, FIFO scheduling may be inefficient, as FIFO scheduling does not enable SIP messages that increase system efficiency to be processed earlier. For example, it may improve the overall efficiency of the entire IMS network if certain SIP messages, such as those that terminate communication sessions, are given priority over some other types of SIP messages. Second, FIFO scheduling also does not enable service differentiation between various types of user services. In other words, in a conventional FIFO system, all SIP messages, whether they are time sensitive or not, are treated identically. For example, certain services, such as push-to-talk services, may be less amenable to "waiting" in line than other types of services, and FIFO systems cannot differentiate between the various types of services. Third, FIFO scheduling also does not permit differentiation based on classes of service. For example, conventional SIP servers are configured to treat all SIP messages equally, which prevents IMS network administrators from offering upgraded or premium service options for a higher cost. Fourth, it has been mathematically proven that networks can become unstable when messages can loopback through one or more network elements processing the incoming messages under a FIFO scheduling policy. As IMS networks allows SIP messages to loopback through one or more SIP proxies, if these SIP proxies use FIFO scheduling, the network is exposed to possible instability.

In view of the above-described disadvantages of conventional FIFO scheduling of SIP messages, a system or method of prioritizing SIP messages would be advantageous. As such, one or more of the embodiments described below may be directed towards a system and method for prioritizing SIP messages in an IP multimedia subsystem ("IMS") network. More specifically, one or more of the embodiments described herein may be directed towards a SIP server that is configured to determine a priority for an incoming SIP message, to compare the priority of the incoming message to the priorities of other SIP messages awaiting transmission in the SIP server's queue, and to place the incoming SIP message within the queue based on the results of the comparison.

Turning now to the drawings and looking first to FIG. 1, a block diagram of an exemplary SIP message in accordance with one embodiment is illustrated and generally designated by a reference numeral 10. As illustrated, the SIP message 10 has three parts: a start line 12, a header 14, and a message body 16. The start line 12 may include the SIP version, the type of SIP message, and the SIP address. The SIP message type in the start line may include a variety of SIP request message types including, but not limited to, INVITE to invite user agents to a session, ACK to confirm receipt of a SIP message, REFER to refer a SIP device to another user agent, OPTIONS to query media types, BYE to terminate a session, CANCEL to cancel a pending transaction, REGISTER to add an IP address to the IMS network, and/or MESSAGE to initiate an instant message.

Figure 2:
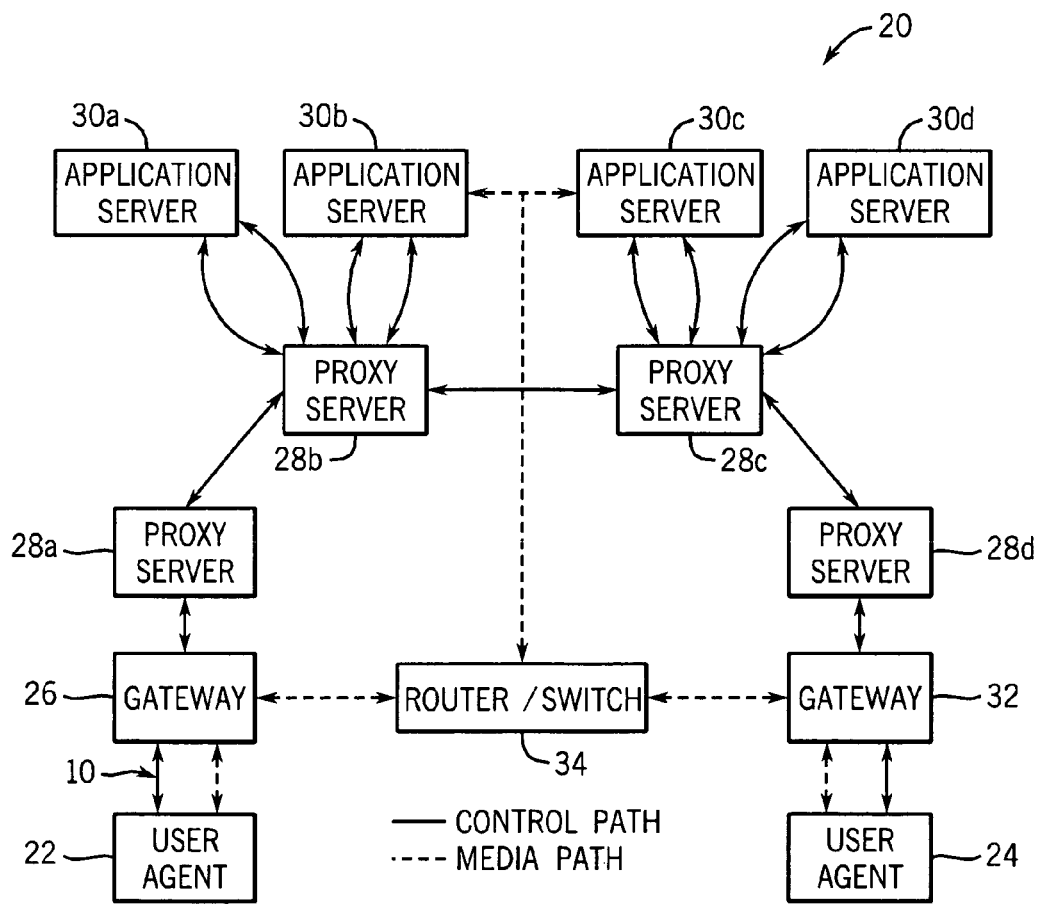
FIG. 2 is a block diagram of an exemplary IMS network configured to prioritize SIP messages in accordance with one embodiment.

The header 14 may include a plurality of message header fields that contain information related to the routing of the SIP message 10 through an IMS network, such as the IMS network illustrated in FIG. 2. For example, the header 14 may include fields indicating the identity of a user agent originating the SIP message 10, the identity of the intended recipient of the SIP message 10, the subject of the SIP message, the service type of the message (e.g., the type of application), the hops that the SIP message 10 has made in the IMS network. The header 14 may also contain fields that store quality of service ("QoS") related data, fields that store grade of service ("GoS") data, and/or fields that store other data that enables differentiation amongst user agents or services in the IMS network.

Further, the header 14 may include one or more fields configured to store timestamps for the SIP message 10. For example, the header 14 may include a field that contains a timestamp indicative of when the SIP message 10 entered the IMS network (hereafter referred to as the "network entry timestamp"). The header 14 may also include fields that store a timestamp indicative of when the SIP message 10 entered and/or departed any one of servers (e.g., a proxy server) within the IMS network.

The header 14 may also include a field that stores the cumulative latency of the SIP message 10. For example, when the SIP message 10 arrives at a server within the IMS network, the latency field may be updated to reflect the total time that has passed since the SIP message 10 entered the IMS network by subtracting the network entry timestamp from the current system time.

As described above, the header 14 may include a variety of header fields that may be indicative of the relative priority of the SIP message 10. In one embodiment, these additional fields may be added to conventional SIP message header to store this information. For example, a field indicative of the cumulative latency and/or the cumulative processing time of the SIP message 10 may be added to the header 14. In another embodiment, existing standardized SIP fields may be used to store the priority information. For example, the 3GPP SIP message standard already includes a field indicative of the number of hops that the SIP message 10 has taken in the IMS network. In yet another embodiment, standardized header fields, such as those outlined in the 3GPP standard, may be modified to store the priority information. For example, the 3GPP standard includes a "priority" field is indicative of the whether or not the SIP message is related to a 911 emergency call. In one embodiment, this field may be modified to store one or more of the priority indicators described above. It will be appreciated, however, that these header field options are not exclusive. As such, priority information may be stored in new header field, standardized header fields, modified standardized header, or a combination thereof.

Moreover, those of ordinary skill in the art will also appreciate that the above-described header fields in the header 14 are only illustrative of a few of the multitude of possible fields in the header 14. As such, in alternate embodiments, a wide variety of suitable header fields in addition to or in place of those described above may be included within the header 14. For example, in one embodiment, the header 14 may include sixty-five or more fields.

The SIP message 10 may also include the message body 16, which contains the information used to establish a communication session. For example, in one embodiment, the message body 16 may include a session description protocol ("SDP") payload that provides information on the originator of the SIP message 10, ports to use for the communication session, information on available media types, and/or information on codecs to use for the communication session. In alternate embodiments, other suitable communication session related information may also be included in the message body 16.

As described above, the SIP message 10 facilitates the establishment of a communication session between two user agents in an IMS network. Accordingly, FIG. 2 is a block diagram of an exemplary IMS network 20 configured to prioritize SIP messages, such as the SIP message 10, in accordance with one embodiment. The network 20 may include an originator user agent 22 and a destination user agent 24. The user agents 22 and 24 may include any one of a number of suitable telecommunication devices, such as telephones (either wired or wireless), computers, PDAs, and so forth.

For illustrative purposes, the discussion below of the IMS network 20 focuses on using the SIP message 10 to request a new communication session between the user agents 22 and 24 (in other words, a SIP message of the INVITE message type) via SIP proxy servers. It will be appreciated, however, that the INVITE message type is merely one example of a SIP message type and, thus, is not intended to be exclusive. Accordingly, in other embodiments, other SIP message types besides the INVITE message type may be transmitted within the IMS network 20. Moreover, in still other embodiments, back to back user agents ("B2BUAs") or other suitable types of servers may also be employed in the IMS network 20.

The user agent 22 may employ the SIP message 10 with the INVITE message type to invite the user agent 24 to participate in a communication session with the user agent 22. More specifically, the user agent 22 may create the SIP message 10 with the INVITE message type. After the user agent 22 has created the SIP message 10, it may transmit the SIP message 10 to a network gateway 26 that provides an interface between the user agent 22 and the other components of the IMS network 20. In various embodiments, the gateway 26 may include a wireless modem, a wireless base station, a wired modem, or any other suitable form of network connection.

When the gateway 26 receives the SIP message 10, it forwards the SIP message 10 to a proxy server 28a. The proxy server 28a (as well as proxy servers 28b, 28c, and 28d that are described further below) is a specialized server that is configured to forward SIP requests and responses through the IMS network 20. Although the user agents 22 and 24 can communicate without the proxy servers 28a-d, as described below, the proxy servers 28a-d provide a variety of practical services that assist in the management of communication sessions between the user agents 22 and 24. For example, the proxy servers 28a-d may be configured to route requests through the IMS network 20, to authenticate and provide security, to authorize the user agents 22 and 24 for particular services, to implement call routing policies, to provide other features to the user agents 22 and 24, and/or to track usage of the IMS network 20.

As illustrated in FIG. 2, the SIP message 10 may travel through the gateway 26 and through a plurality of proxy servers 28a-d in route to the user agent 24. This logical path through the IMS network 20 is referred to as the "control path." The control path is the path that SIP messages follow through the IMS network; whereas a typically more-direct "media path," which is described further below, may be employed to transmit data between the user agents 22 and 24 once the communication session has been established.

The SIP message 10 may travel along the control path to the proxy server 28b. The proxy server 28b may be configured to route the SIP message 10 through one or more application servers 30a and 30b. The application servers 30a and 30b are computers that host end-user services in the IMS network 20. For example, each of the application servers 30a-d may host one or more data and/or multimedia services, such as video, audio, instant messaging, push-to-talk capabilities, voice over IP telephone calls, and so forth. It will appreciated that although two application servers 30a and 30b are illustrated in FIG. 2, depending on the number of multimedia services available in the IMS network 20 and the number of user agents, any suitable number of application servers 30a-d may be included in the IMS network 20.

The SIP message 10 may be routed to the application servers 30a-d that are associated with multimedia services requested by the user agent 22 (as defined in the SIP message 10). For example, if the user agent 22 requested to establish an instant messaging session with the user agent 24, the proxy server 28b may transmit the SIP message 10 to the application server that supports instant messaging, such as the application server 30a, for example. The process of passing the SIP message 10 through the application servers 30a-d and back to the SIP proxy 28b is known as "spiraling." When the application server 30a receives the SIP message 10 it may modify the message body 16 of the SIP message 10 to include the IP address of the application server 30a, such that this application server will be a permanent member of the control path for this communication session. The application server 30a may also be configured to modify other attributes of the SIP message. For example, the application server may append the SIP message 10 with a timestamp indicative of the time that the SIP message 10 arrived at or departed the application server 30a. As will be described below, this timestamp may facilitate prioritization of the SIP message 10.

After the proxy server 28b has transmitted the SIP message to the application server 30a, which in turn transmits the modified message back to proxy server 28b, the proxy server 28b must decide if another application server needs to be involved. If so, the proxy server 28b sends a newly modified message to application server 30b, which in turn forwards a third embodiment of message 10 back to proxy server 28b.

At this point, the proxy server 28b will be able to transmit the SIP message 10 to the proxy server 28c. As illustrated in FIG. 2, the proxy server 28c may spiral the SIP message 10 to one or both of the application servers 28c and 28d. As with the application servers 30a and 30b, when the application server 30c or 30d receives the SIP message 10 it may modify the message body 16 of the SIP message 10 to include the IP address of the application server 30c or 30d, such that this application server will be a permanent member of the control path for this communication session. In one embodiment, the application servers 30a and 30b are configured to execute applications on behalf of the user agent 22, and the application servers 30c and 30d are configured to execute applications on behalf of the user agent 24.

It will be appreciated, however, that the application servers 30a-d are illustrated as coupled to the proxy server 28b for illustrative purposes only. As such, in alternate embodiments, the application servers 30a-d may be coupled to another one of the proxy servers 28a-d or to multiple proxy servers 28a-d. Further, it will be appreciated that four proxy servers 28a-d are illustrated for exemplary purposes only. Accordingly, in alternate embodiments, the SIP message 10 may travel through any suitable number of proxy servers en route from the user agent 22 to the user agent 24. Moreover, other types of SIP servers, although not illustrated in FIG. 2, may also be coupled to the proxy servers 28a-d. These additional SIP servers include, but are not limited to, home subscriber or location servers, domain name servers, and redirection servers.

The proxy server 28c will then transmit the SIP message along the control path to the proxy server 28d, which will transmit the SIP message 10 to the gateway 32. The gateway 32, similar to the gateway 26 described above, is a connection between other components of the IMS network 20 and the user agent 24. In various embodiments, the gateway 32 may include a wireless modem, a wireless base station, and/or a wired connection.

When the user agent 24 receives the SIP message 10, the user agent 24 will send a response SIP message back through the IMS network 20 along the control path. After a predetermined number of SIP messages rounds (six in an exemplary 3G system), a communication session with the user agent 22, may be established. Once established, subsequent non-SIP transmissions between the user agent 22 and the user agent 24 or between the user agents 22 and 24 and the application servers 30a-d may bypass the proxy servers 28a-d and travel directly between the user agents 22 and 24 via non-SIP routers and/or switches 34. It will be appreciated, however, that both SIP and non-SIP communications may also still travel through the proxy servers 28a-d along the control path.

Figure 3:
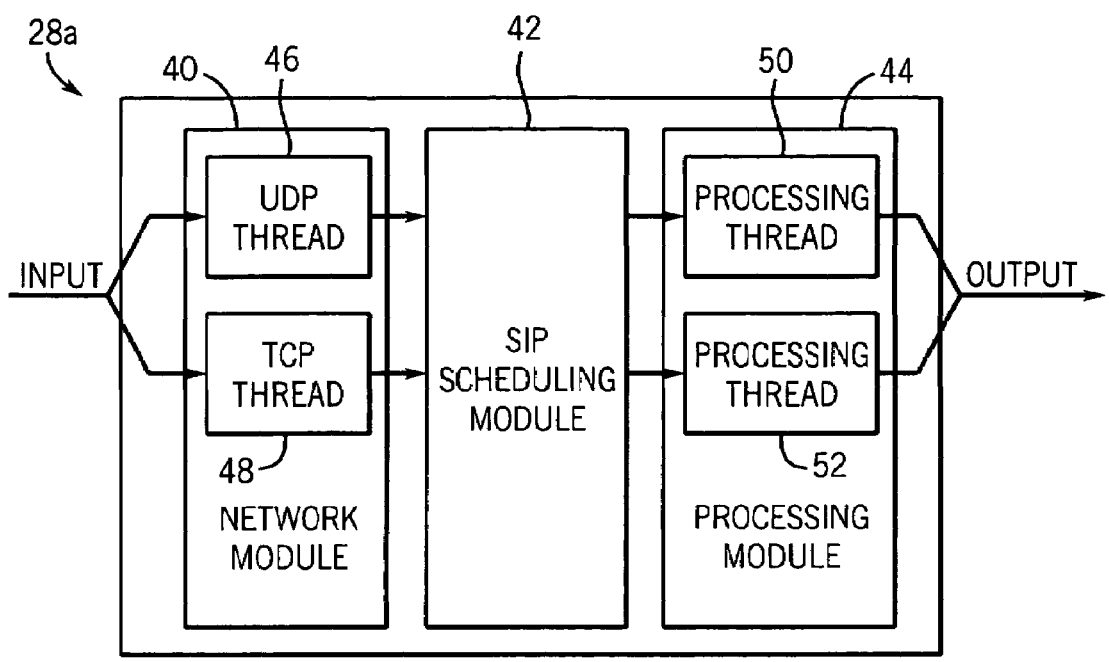
FIG. 3 is a block diagram of an exemplary SIP proxy server configured to prioritize SIP messages in accordance with one embodiment.

As described above, conventional SIP servers are configured to process received SIP messages 10 in a first-in, first-out ("FIFO") order, as outlined above. This conventional FIFO configuration, however, has numerous disadvantages and inefficiencies. For this reason, one or more of the SIP servers in the IMS network 20, such as the proxy servers 28a-d and/or the application servers 30a-d, are configured to prioritize incoming SIP messages 10. Accordingly, FIG. 3 is a block diagram of the exemplary SIP proxy server 28a configured to prioritize SIP message in accordance with one embodiment. It will be appreciated, however, that the discussion below may be application to any suitable type of SIP server besides the SIP proxy server 28a.

As illustrated in FIG. 3, the proxy server 28a may include a network module 40, a SIP scheduling module 42, and a processing module 44. The network module 40 may be configured to act as a junction between the proxy server 28a and the other components of the IMS network 20. In one embodiment, the network module 40 may include a plurality of software constructs, known as threads, which are configured to receive SIP messages from one or more ports on the proxy server 28a. For example, the network module 40 may include a user datagram protocol ("UDP") thread to receive SIP messages from a UDP port and a transmission control protocol ("TCP") thread to receive SIP messages from a TCP port. It will be appreciated, however, that the UDP thread 46 and the TCP thread 48 are merely exemplary. As such, in alternate embodiments, the network module may include threads configured to receive Stream Control Transmission Protocol ("SCTP") or other suitable communication protocols.

Figure 4:
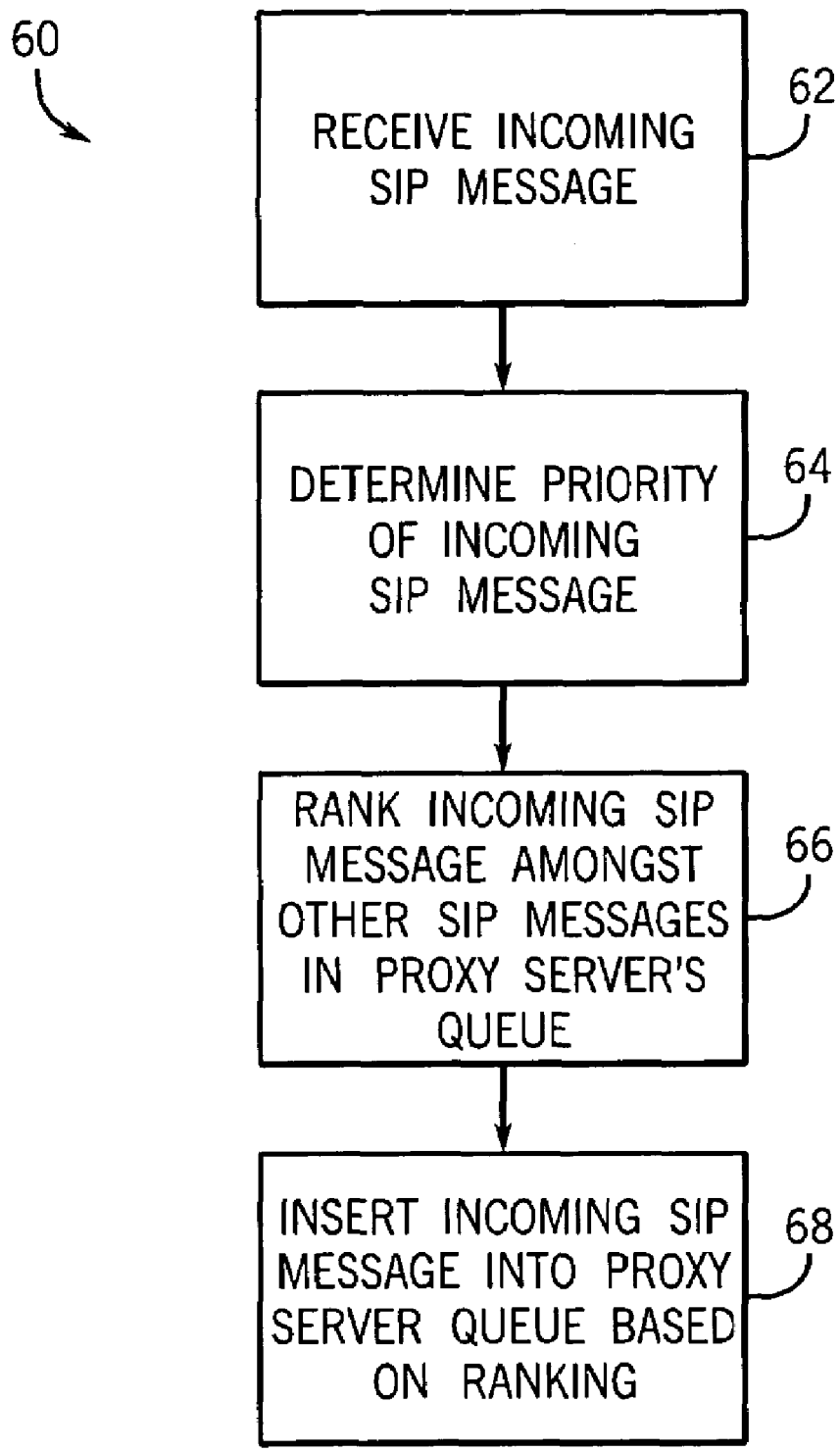
FIG. 4 is a flow chart illustrating an exemplary technique for prioritizing SIP messages in accordance with one embodiment.

The network module 40 may transmit the received SIP message 10 to the SIP scheduling module 42, which is configured to maintain a queue of received SIP messages and to prioritize newly received SIP messages within that queue. For example, FIG. 4 is a flow chart illustrating an exemplary technique 60 for prioritizing SIP messages in accordance with one embodiment. In one embodiment, the technique 60 may be executed by the SIP scheduling module 42 using a JAIN™ SIP compliant JAVA stack. For example, the technique 60 may be executed on a MiLife™ SIP server produced by Lucent Technologies. In alternate embodiments, the technique 60 may be executed by other components of the IMS system, such as the proxy servers 28b-d, the application servers 30a-d, the gateways 26 and 32, and/or back to back user agents (not shown in FIG. 2). Moreover, in one embodiment, the SIP scheduling module 42 may include a plurality of queues configured to store SIP messages 10 of different priorities. For example, one queue may store higher priority message while another queue stores lower priority messages.

As illustrated, the technique 60 may begin with the scheduling module 42 receiving the incoming SIP message 10, as indicated by block 62. Once the incoming SIP message 10 has been received, the SIP scheduling module 42 may determine the priority of the incoming SIP message 10, as indicated by block 64. In various embodiments, the SIP scheduling module 42 may employ a variety of different suitable prioritization techniques to determine the priority of SIP messages, such as the incoming SIP message 10.

One such exemplary technique involves prioritizing the SIP messages 10 based on the cumulative latency (also referred to as the "network age") of a particular SIP message. More specifically, as described above, the SIP message 10 may include the network entry timestamp. By subtracting this timestamp from the current system time, the proxy server 28a may determine how long a SIP request has not been resolved on the IMS network 20—i.e., the network age of the SIP request. Alternatively, the SIP message 10 may store the accumulated processing and queuing time for the SIP message 10 and use this stored value as the network age of the SIP message 10. In other words, the network age of the SIP message could also be measured as the amount of time the SIP message 10 is under the control of the proxy servers 28a-d.

Once the network age of the SIP request has been determined, the SIP Scheduling module 42 may employ this information to determine the priority of the SIP message 10. In one embodiment, the network age itself may indicate the priority of the message. In such an embodiment, the SIP Scheduling module 42 is configured to rank the SIP messages 10 using the network age alone (e.g., those SIP messages with higher network ages will have higher priority, those SIP messages with lower network ages have a lower priority, and so forth).

Figure 5:
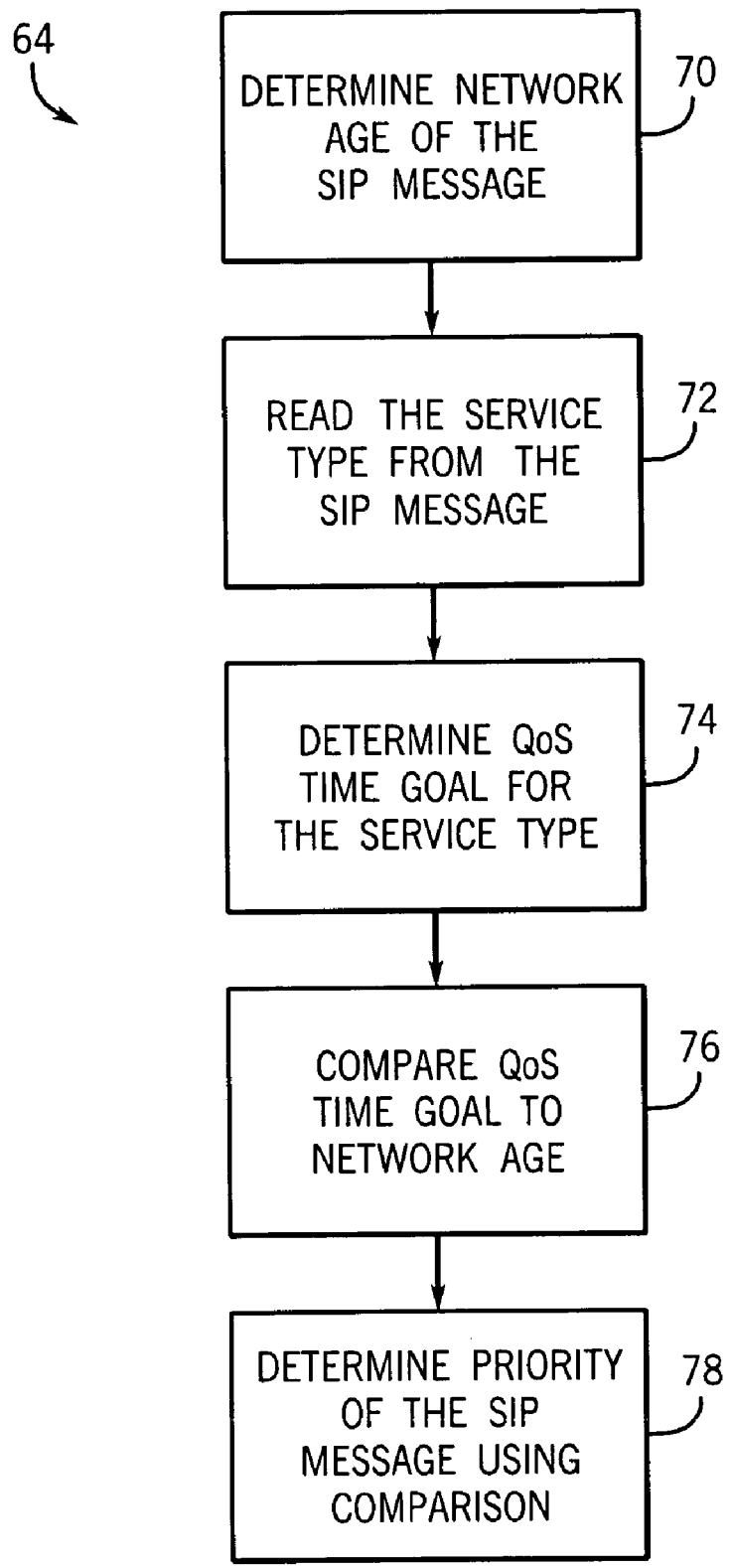
FIG. 5 is a flow chart illustrating an exemplary technique for determining a priority of a SIP message in accordance with one embodiment.

In another embodiment, however, the network age may be combined with the service type stored in the SIP message 10 to determine the priority of the SIP message 10. Accordingly, FIG. 5 is a flow chart illustrating an exemplary technique 64 for determining the priority of the SIP message 10 using the network age and service type in accordance with one embodiment. In this embodiment, the network age of the SIP message 10 may first be determined in the manner described above (block 70). Next, the SIP Scheduling module 42 may read the service type information (e.g., push-to-talk, e-mail, and the like) from the SIP message 10, as indicated by block 72. After the service type has been read, the proxy server may determine a QoS target time goal associated with the service type, as indicated in block 74. The QoS target time goal is a target transmission time through the IMS network 20 that is facilitates the maintenance of quality of service standards for the service type of the SIP message. For example, push-to-talk services typically target to transmit the SIP message in less then 0.5 seconds, voice over IP targets less than one second, and so forth.

After the QoS time goal for the SIP message 10 has been determined, the proxy server 28a may compare the QoS time goal to the network "age" of the SIP message 10, as indicated in block 76. Once this comparison is made, the proxy server 28a may assign priority values based on how "close" the network age is to the QoS time goal for the SIP message, as indicated in block 78. For example, those SIP messages with network ages near or past the QoS time goal may be assigned a high priority while those further from the QoS time goal are assigned lower priority values. In one embodiment, the priority value may be a function of how close (or how far past) the network age is to the QoS time goal and the application's degree of tolerance to violations of this goal.

Returning now to block 64 of FIG. 4, in another embodiment, determining the priority of the incoming message may include assigning the SIP message 10 a priority based on one or more priority indicators stored in the header 14 of the SIP message 10. As described above, the header 14 may include fields indicating the identity of a user agent originating the SIP message 10, the identity of the intended recipient of the SIP message 10, the subject of the SIP message, the service type of the message (e.g., the type of application), the number of "hops" that the SIP message 10 has made in the IMS network, and/or an indication of the cumulative amount of processing resources applied to the SIP message 10. In addition, the header 14 may also contain fields that store quality of service ("QoS") related data, fields that store grade of service ("GoS") data, and/or other suitable fields that store other data that enables differentiation amongst user agents or services in the IMS network.

Accordingly, one or more of the above-outlined priority indicators stored in the header fields or another suitable priority-indicative header field may be employed to determine the priority of the SIP message 10. More specifically, the priority may be a function of the type of service, QoS related data, GoS related data, the number of hops that the SIP message 10 has taken, the cumulative amount of processing time expended on the SIP message 10, and so forth. For example, in one embodiment, where the priority is based on the type of service, all SIP messages of one type of service (push-to-talk, for example) may be prioritized over all SIP messages of another type of service (voice over IP, for example), which may be prioritized over another type of service, and so forth.

More specifically, in this embodiment, when the SIP scheduling module 42 receives the SIP message 10 it may determine the service type stored in the SIP message 10—i.e., push-to-talk in this example. The SIP scheduling module 42 may then determine a numerical priority value associated with the exemplary service type of push-to-talk. This priority value is a numerical value that reflects the relative priority for processing and/or retransmission of the push-to-talk message in comparison to other service types of messages. For example, the priority value for the push-to-talk service type may be 5; whereas the priority value for an instant messaging SIP message may be 1, where higher numerical values indicate higher priority service types. In one embodiment, the SIP scheduling module 42 may store a list of the numerical values associated with each header field value (e.g., in the above example, a list of the numerical values associated with each of the service types).

In further example, if the priority value is based on GoS factors instead of service type, those SIP messages that originate from user agents 22 using higher cost service plans may be assigned higher priority values than those SIP messages originating from user agents 22 with lower cost service plans. As described further below, once the priority value has been assigned, the SIP scheduling module 42 may use the priority value to rank the SIP message 10 amongst other received SIP messages for transmission to one of the processing threads 50 and 52, as described further below with regard to block 68.

Similarly, in another embodiment, the priority value may be a function of the message type stored in the start line 12 of the SIP message 10. For example, those SIP messages of one message type, BYE for example, may be assigned a higher priority value by the SIP scheduling module 42 than SIP messages of other message types, such as the INVITE message type. More specifically, the SIP messages of the BYE message type may be assigned a higher priority value, because BYE messages terminate communication sessions and, thus, may lessen congestion of the IMS network 20 if they are processed sooner. Another suitable technique for determining the priority of the SIP message 10 involves calculating a time-weighted priority value for the incoming SIP message 10. In this embodiment, the time-weighted priority value for the SIP message 10 is calculated by multiplying the network age of the SIP message (as described above) by the numerical priority value of the SIP message (as also described above). For example, if the priority value is based on the message type, the SIP scheduling module 42 may determine the priority value for the SIP message 10 and then multiple the determined priority value by the network age of the SIP message 10 to obtain the time-weighted priority value for the SIP message 10. For example, if a first SIP message arrives at the SIP scheduling module 42 with a message type of instant messaging and a network age of 0.6 seconds, the time-weighted priority value would be 0.6 (i.e., 1*0.6—assuming instant messaging has a priority value of 1). If, on the other hand, a second SIP message arrives at the SIP scheduling module 42 with a message type of push-to-talk and a network age of 0.4 seconds, its time-weighted priority value would be 2.0 (i.e., 5*0.4—assuming push-to-talk messages have a priority value of 5, as described above). In this way, the SIP scheduling module 42 is able to prioritize incoming messages based on both priority indicators within the header 14 and the network age of the SIP message 10. As will be described further below, this prioritization may be employed to order the SIP message 10 amongst other SIP messages for processing by one of the processing threads 50 and 52

In another embodiment, the SIP proxy server 28a may also be configured to readjust a message's priority to change the downstream processing of the SIP message 10. In particular, the SIP proxy server 28a will adjust one or more of the timestamps stored in the header 14 of the SIP message 10. For example, the SIP proxy server 28a may adjust the timestamp indicative of the time that the SIP message 10 entered the IMS network 20 in order to artificially boost the priority of the SIP message 10 by making it appear to other components of the IMS network 20, i.e., downstream components, that the SIP message 10 has a network age greater than its actual network age. Adjusting the network age in this way may result in downstream components (e.g., the proxy server 28d) giving the SIP message 10 a higher priority than other messages that have the same actual network age (or older). Advantageously, this higher priority enables the SIP message 10 to be processed more quickly than other messages, which decreases its total transmission time through the IMS network 20.

More specifically, in one embodiment, the SIP proxy server 28a may first be configured to identify SIP messages containing one or more priority indicators (e.g., service type, QoS factors, and so forth, as described above). For example, the SIP proxy server 28a will identify all push-to-talk SIP messages. Next, when a SIP message that contains the priority indicator arrives at the SIP proxy server 28a, the SIP proxy server 28a will adjust the network entry timestamp of the SIP message 10 to indicate a network age at or near the QoS target time goal. In one embodiment, the SIP proxy server will adjust the network age time stamp to indicate a network age of approximately 80% of the QoS target time goal. For example, if push-to-talk messages have a 0.5 second QOS target time goal, the SIP proxy server 28a will change the network entry timestamp to be 0.4 seconds before the current time. Once the timestamp has been changed, the SIP proxy server 28a will prioritize the SIP message 10 (see block 64 above) based on the adjusted timestamp.

Adjusting the network age of the SIP message 10 in the above-described manner provides another technique for prioritizing based on both priority indicators within the header 14 and the network age of the SIP message 10. Advantageously, adjusting the network age of the SIP message 10 may simplify the ranking of SIP messages by the SIP scheduling module 42 (described in more detail below with regard to block 66 of FIG. 4), because the ranking can be performed solely as a function of the relative network ages of the all SIP messages awaiting processing. In other words, even though the prioritization is actually based on both priority indicators and actual network age, the SIP scheduling module 42 can be configured to assign priorities using the network age alone, because the network age has been adjusted to take into account the priority indicators from the SIP message.

For example, if the target goal time for a push-to-talk SIP message is 0.5 seconds, the SIP proxy server 28a may be configured to identify SIP messages associated with push-to-talk services and to adjust the timestamp stored in the header 14 to indicate that the push-to-talk SIP message has a network age of .0.3 seconds. Conversely, the SIP proxy server 28a may be configured not to adjust the timestamp of SIP messages associated with instant messaging. In this way, similar to the time-weighted priority values described above, the SIP messages may be assigned priorities based on both a priority indicator from the header 14 and a network age. It will be appreciated, however, that this example is merely exemplary.

Figure 6:
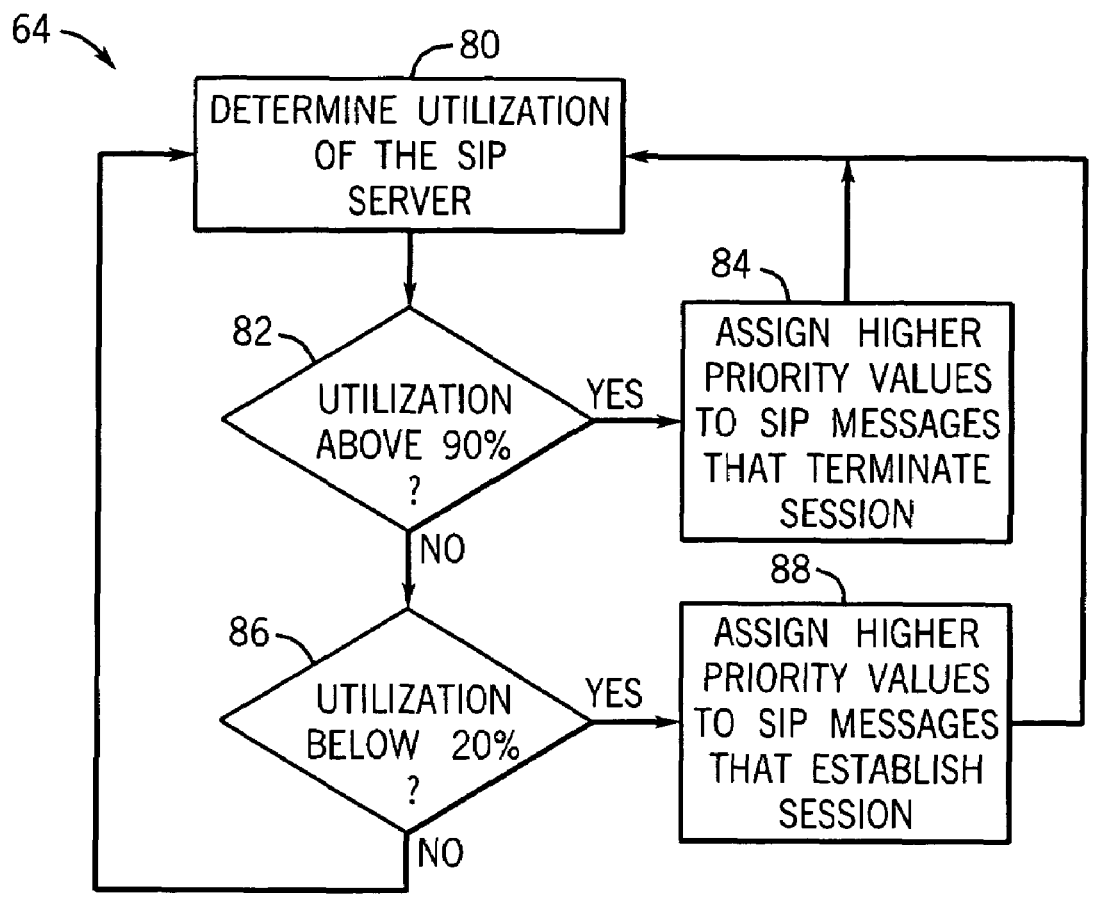
FIG. 6 is a flow chart illustrating another exemplary technique for determining the priority of a SIP message in accordance with one embodiment.

In yet other embodiments, the SIP scheduling module 42 may be configured to prioritize the SIP message 10 based on the utilization of a SIP server, such as the SIP proxy server 28a, for example. In other words, the SIP scheduling module 42 may be configured to prioritize certain types of SIP messages ahead of other types of SIP messages depending on how busy the SIP proxy server 28a is. For example, FIG. 6 is a flow chart of another exemplary technique 64 for determining the priority of the incoming SIP message 10 in accordance with one embodiment. As illustrated by block 80 in FIG. 6, the technique 64 may begin by determining the utilization of the SIP proxy server 28a. In one embodiment, the SIP scheduling module 42 may be configured to track the utilization of the SIP proxy server 28a, and, thus, may determine the utilization of the SIP proxy server 28a by accessing its memory.

If the SIP proxy server 28a is running at or near its capacity (e.g., 90% CPU utilization in the embodiment illustration in block 82 of FIG. 6), the SIP scheduling module may then be configured to assign higher priority values to those SIP messages that terminate communication sessions and, thus, reduce the utilization of the SIP proxy server 28a (block 84). In other words, those SIP messages that may serve to reduce overall network congestion are "pushed" to the front of the queue by nature of the higher priority values rather than having to wait. Exemplary SIP messages that terminate session may include SIP messages of the message types BYE or CANCEL.

On the other hand, if the SIP proxy server 28a is running below capacity (e.g., 20% or less CPU utilization in the embodiment illustrated in block 86), the SIP scheduling module may be configured to assign higher priority values to those SIP messages that establish new communication sessions, such as the INVITE or MESSAGE message types (block 88). Similarly, prioritization may also be based on network utilization of the INS network 20 or memory usage of the SIP proxy server 28a. For example, if the SIP proxy server 28a has used up most of its memory, those SIP messages that may serve to reduce the demand on the SIP proxy server 28a may be given priority.

Those of ordinary skill in the art will appreciate that the above-described prioritization techniques are merely exemplary and, thus, are not intended to be exclusive. As such, the prioritization technique employed by the SIP scheduling module 42 may include one of the techniques described above, may include a combination of the techniques described above, or may include other suitable prioritization techniques.

Returning again to FIGS. 3 and 4, the technique 60 may continue with the SIP scheduling module 42 ranking the incoming SIP message amongst the other SIP messages waiting in a SIP message queue (not shown) of the SIP scheduling module 42, as indicated by block 66. Because each of the SIP messages within the SIP message queue were assigned priority values upon their arrival at the SIP scheduling module 42, ranking the incoming SIP message may simply involve determining where in the queue the incoming SIP message should be located. In other words, the incoming SIP message is placed behind higher priority SIP messages but in front of lower priority SIP messages.

After the incoming SIP message has been ranked, the SIP scheduling module 42 may be configured to insert the incoming SIP message into the appropriate location within the queue, as indicated by block 68. Once the incoming SIP message reaches the top of the SIP message queue, the SIP scheduling module 42 will transmit the incoming SIP message to one of the processing threads 50 and 52 within the processing module 44. Similar to the UDP thread 46 and the TCP thread 48, the processing threads 50 and 52 are software constructs that are configured to process the SIP message and to transmit it to another one of the proxy servers 28b-d, one of the application servers 30a-d, the gateway 32, or another computer or electronic device.

In one embodiment, the SIP proxy sever 28a may be also configured to prioritize SIP messages after they have been processed by the processing threads 50 and 52. More specifically, if the SIP proxy server is busy, the processing threads 50 and 52 may be able to process the SIP messages faster than the SIP proxy server 28a is able to transmit them along to the next server along the control path. In this case, the processing module 44 may be configured to create a queue of SIP messages awaiting transmission. This transmission queue may also be prioritized using the technique 60 illustrated in FIG. 4 and/or the techniques illustrated in FIGS. 5 and 6. For example, processed SIP messages may be prioritized based on service type, network age, time weighted priority value, network utilization, and so forth.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

We claim:

1. A method of prioritizing SIP messages in a network, the method comprising:
receiving SIP messages in a first order from one or more other servers of the network, wherein each of the received SIP messages comprises one or more priority indicators;
scheduling the received SIP messages into a second order based on one or more of the priority indicators, wherein the scheduling comprises:
calculating a priority value for each of the received SIP messages based on the one or more priority indicators;
associating the calculated priority value with the SIP message; and
scheduling the received SIP messages based on the priority values;
processing the scheduled SIP messages in the second order.

2. The method, as set forth in claim 1, wherein scheduling the received SIP messages comprises scheduling the received SIP messages based on a priority indicator stored in a header field of each of the received SIP messages.

3. The method, as set forth in claim 1, wherein each of the received SIP messages is associated with a type of service and wherein the scheduling comprises scheduling the received SIP messages for transmission based on the type of service associated with the received SIP message.

4. The method, as set forth in claim 1, wherein the priority value for SIP messages associated with a first application server is different than the priority value for SIP messages associated with a second application server.

5. The method, as set forth in claim 1, wherein the priority value for SIP messages of a BYE message type have a different priority value than SIP messages of an INVITE message type.

6. The method, as set forth in claim 1, wherein the scheduling comprises scheduling the received SIP messages based on a time-weighted priority value calculated from both a network age and the priority value of each of the received SIP messages.

7. The method, as set forth in claim 1, further comprising:
scheduling the processed SIP messages into a third order based on the priority indicators; and
transmitting the processed SIP messages to another server in the third order.

8. The method, as set forth in claim 1, wherein the one or more priority indicators comprise cumulative latency indicators related to time in the network by the SIP messages.

9. A server comprising:
a SIP scheduling module, wherein the SIP scheduling module is configured to:
receive SIP messages in a first order from one or more other servers of a network, wherein each of the received SIP messages comprises one or more priority indicators;
schedule the received SIP messages into a second order based on one or more of the priority indicators, wherein scheduling the received SIP messages into a second order comprises calculating a priority value for each of the received SIP messages based on one or more of the priority indicators, a calculated priority value being associated with each of the received SIP messages; and
process the scheduled SIP messages in the second order.

10. The server, as set forth in claim 9, wherein the server comprises a SIP proxy server.

11. The server, as set forth in claim 9, wherein the SIP scheduling module is configured to schedule the received SIP messages based on a grade of service value associated with each of the received SIP messages.

12. The server, as set forth in claim 9, wherein the SIP scheduling module is configured to schedule the received SIP messages based on a quality of service value associated with each of the received SIP messages.

13. The server, as set forth in claim 9, wherein the server is configured to adjust a timestamp stored in the received SIP message based on a priority value associated with each of the received SIP messages.

14. The server, as set forth in claim 9, wherein the SIP scheduling module is configured to schedule the received SIP messages based on a time-weighted priority value calculated from both a network age and a priority value of each of the received SIP messages.

15. The server, as set forth in claim 9, wherein the one or more priority indicators comprise a cumulative latency indicator related to time in the network by the SIP messages.

16. A method of operating a proxy server comprising:
receiving an incoming SIP message at the proxy server;
calculating a priority value for the incoming SIP message based on priority indicators of the incoming SIP message;
ranking the incoming SIP message amongst other SIP messages in a SIP message queue based on the calculated priority value; and
inserting the incoming SIP message into the SIP message queue based on its ranking.

17. The method, as set forth in claim 16, wherein inserting the incoming SIP message into the SIP message queue comprises inserting the incoming SIP message into the SIP message queue of a SIP proxy server.

18. The method, as set forth in claim 16, wherein calculating a priority for the incoming SIP message comprises determining a priority for a processed SIP message awaiting transmission from a SIP proxy server.

19. The method, as set forth in claim 16, wherein ranking the incoming SIP message amongst other SIP messages comprises ranking the incoming SIP message based at least partially on a utilization level of a SIP server.

20. The method, as set forth in claim 16, wherein the priority indicators comprise a cumulative latency indicator related to the amount of time the incoming SIP message is under the control of the proxy server.

* * * * *

UNITED STATES PATENT AND TRADEMARK OFFICE
CERTIFICATE OF CORRECTION

PATENT NO.       : 7,660,321 B2
APPLICATION NO.  : 11/365240
DATED            : February 9, 2010
INVENTOR(S)      : Cortes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Signed and Sealed this

Twenty-eighth Day of December, 2010

David J. Kappos
*Director of the United States Patent and Trademark Office*